ns patent office 3,463,903
Patented Aug. 26, 1969

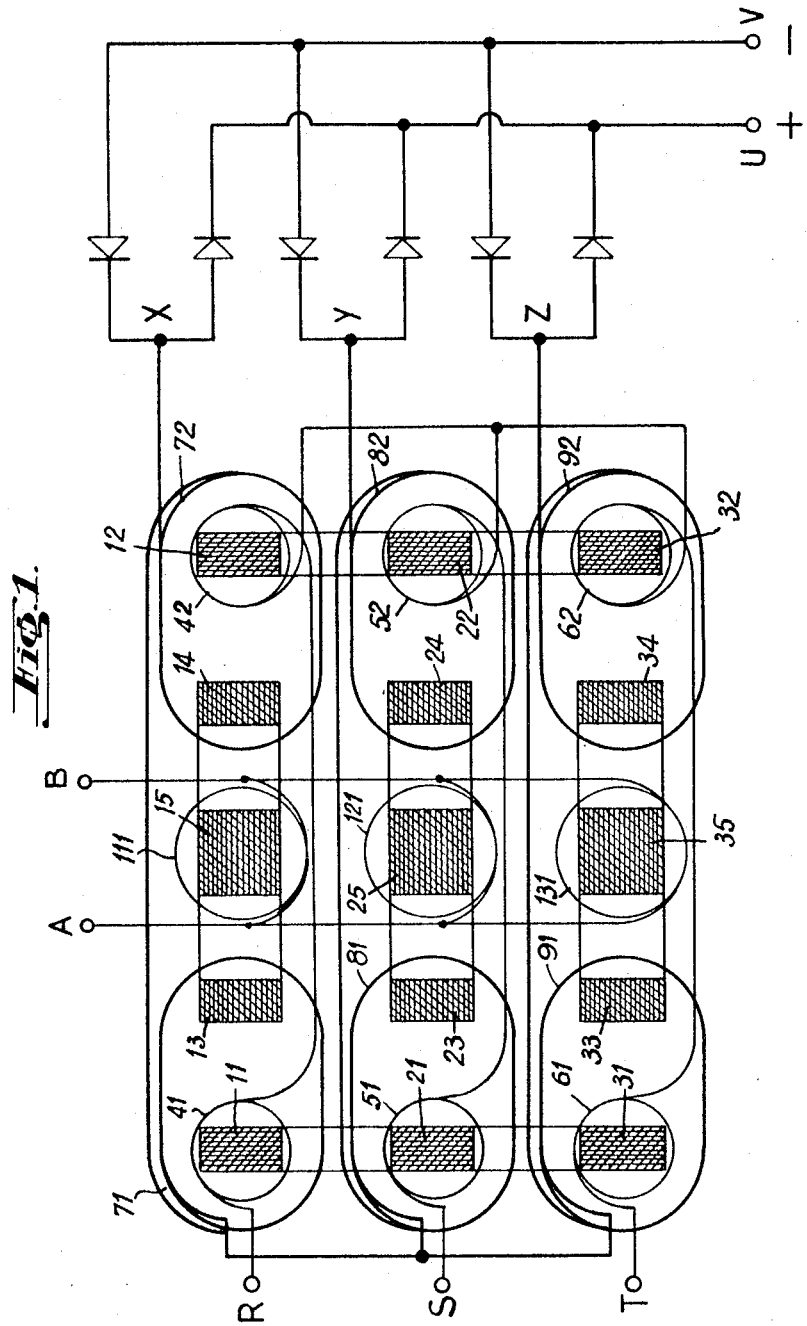

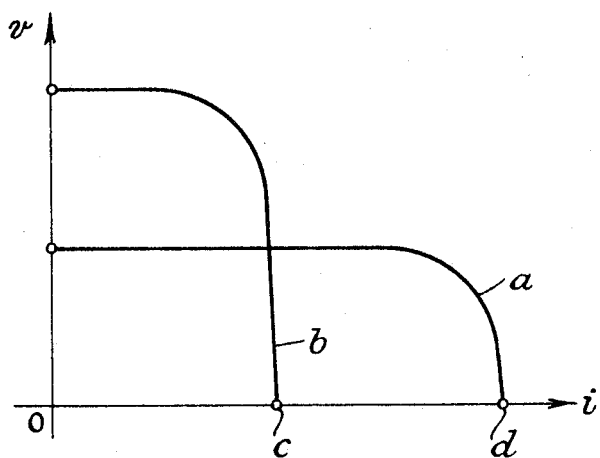

3,463,903
DEVICE FOR THE FEED OF AN ELECTRIC ARC WELDING SET FROM THREE-PHASE CURRENT
Albi Rudaz, Meyrin, Switzerland, assignor to Société Anonyme des Ateliers de Secheron, Geneva, Switzerland
Filed Apr. 4, 1966, Ser. No. 539,926
Int. Cl. B23k 9/10
U.S. Cl. 219—131                                                    7 Claims

ABSTRACT OF THE DISCLOSURE

A three phase electric arc welding power supply set having a three phase power input with two three-phase transformers each having a magnetic core with three columns and three primary windings. A magnetic amplifier has three magnetic cores with three columns each, having a control power input with a control winding and three secondary windings. A power output is provided and rectifying elements. The three magnetic cores of the amplifier are disposed symmetrically between the two magnetic cores of the transformer so that one magnetic core of the amplifier is between one column of one transformer core and one column of the other transformer core. Each outer column of each amplifier core is adjacent to one column of one transformer core and each primary winding of a phase is connected to the power input and surrounding two corresponding columns of the two primary magnetic cores. Each secondary winding is connected to the power output and surrounding a pair of said adjacent columns. The control winding is connected to the control power input and surrounding the middle columns of each amplifier core, and the rectifying elements are disposed after the power output to rectify the welding current.

---

The present invention has for an object a device for the feed of an electric arc welding set, from three-phase current, including rectifying elements. This device is characterized in that it comprises two three-phase transformers each comprising a three column core, and the primaries of which are fed by the inflowing three-phase current, and a magnetic amplifier for the adjustment of the welding current, comprising three magnetic cores with three columns each, the secondaries of the transformers feeding the rectifying elements through the agency of the magnetic amplifier.

The accompanying drawing shows, by way of example, one embodiment of the device according to the invention.

FIG. 1 is a schematic therof, and
FIG. 2 is a diagram of the current voltage characteristics.

The device shown serves for the feed of an electric arc welding set from three-phase current. This device comprises a first three-phase transformer having a core with three columns 11, 21, 31 and a second three-phase transformer also having a core with three columns, 12, 22 and 32. This device further comprises a magnetic amplifier for the adjustment of the intensity of the welding current and which comprises three magnetic cores with three columns each. The three columns of the first core are designated by 13, 14 and 15, the three columns of the second core by 23, 24, 25 and those of the third column by 33, 34, 35.

The primary windings of the transformers are the following: a winding 41 disposed around the core 11, in series with a winding 42 disposed around the core 12; a winding 51 disposed around the core 21 and in series with a winding 52 disposed around the core 22; a winding 61 disposed around the core 31 and in series with a winding 62 disposed around the core 32. The three-phase terminals on the primary sides are designated by R, S and T. In the example shown, the primaries of the two transformers are disposed in series for each phase and the three primaries are star-connected.

The terminals A and B are those of the pre-magnetization circuit. This circuit includes a winding 111 disposed around the core 15 of the magnetic amplifier, a winding 121 disposed around the core 25 and a winding 131 disposed around the core 35. In this example, these three windings are mounted in parallel.

The secondary of the transformers includes the following windings: a winding 71 disposed around both the core 11 of the first transformer and the core 13 of the magnetic amplifier. In the same phase, a winding 72 is disposed around both the core 12 and the second transformer and the core 14 of the magnetic amplifier. The two windings 71, 72 are, in this example, mounted in series.

In a similar manner for the two other phases, the secondaries are: a winding 81 disposed around the cores 21 and 23, in series with a winding 82 disposed around the cores 22 and 24; a winding 91 disposed around the two cores 31 and 33, in series with a winding 92 disposed around the two cores 32 and 34. The secondary terminals are indicated at X, Y and Z and are connected to the leading-out terminals U, V of the device, continuous side, through the agency of six semi-conducting valves as is well known. The secondaries therefore feed, in the present case, the rectifying elements through the agency of the magnetic amplifier.

The operation of the device described is the following:
This device is provided for welding with a refractory electrode. The three-phase feed voltage being supplied at R, S and T, it is a matter of obtaining at the output U, V a current of constant intensity. The direct current of pre-magnetization supplied at A, B is adjusted, by a rheostat for example, in order to obtain at U, V a welding current well defined and corresponding to what is necessary to carry out a given operation. The curve $b$ of FIG. 2 shows the voltage at the terminals U, V in terms of the intensity of the welding current. For each value of the premagnetization current, one will have a similar curve but different, that is to say for which the vertical part of the characteristic is more or less distant from the original. The higher the premagnetization current, the higher the intensity itself corresponding to the vertical part of the characteristic. The welding operation is here carried out at constant intensity, that is to say that one works on the vertical part of the characteristic, thus at a variable potential imposed by the arc itself. The point $c$ where the curve $b$ reaches the axis of the abscissae corresponds to the short-circuit intensity. It is seen that this intensity is practically equal to the working current.

If, instead of connecting up the two secondaries of each phase in series as is the case in the example described, they were connected up in parallel, which is easy to imagine, one would have a variant operating under different conditions corresponding to the case of welding with a fusible wire driven by a feed system. The characeristic would this time be in conformity with the curve $a$ of FIG. 2. The horizontal part of this characteristic obviously corresponds to a voltage half the maximum voltage of the curve $b$. On the other hand, the horizontal part is considerably more extended and it is on this horizontal part that the device then works. This means that the device operates at constant voltage, thus at a variable intensity depending on the feeding speed of the wire. It will be seen that in this case also, the short-circuit intensity is limited but to a value $d$. This is very important because with this device, at the moment of starting up, that is to say when the wire arrives into contact with the work, the current is perfectly limited, which avoids the disadvantages of known apparatus, in particular as regards the rectifying elements (ordinarily silicon diodes) which are no longer subjected to destructive superintensities. One can determine for each wire feeding speed the short-circuit intensity which is the most appropriate. In this variant as in the example described, it is the magnetic amplifier which determines the short-circuited current.

One may advantageously provide, in the case where the two secondary windings of each phase are in parallel, intermediate connections in order to choose the voltage applied at X, Y, Z. This adjustment by intermediate connections to the secondaries permits of adjusting as a first approximation the secondary voltage according to the requirements of the work. A more accurate adjustment of this voltage may be obtained by providing intermediate connections on the primary windings. The primary windings of a same phase may, as shown on the drawing, be in series or if need be, in parallel. One will naturally have a much more accurate adjustment in the case where they are in series.

In practice it will be advantageous to provide a switch permitting of connecting up at will the secondary windings of each phase in series or in parallel, which will permit, with the same device, of working either with a refractory electrode (TIG) or coated electrodes, on the one hand, or with continuous fusible wire fed from a feeding device (MIG–MAG), on the other hand.

As regards the premagnetization circuit, instead of having three windings 111, 121 and 131, one could in another variant have a single winding passing around all the three columns 15, 25 and 35.

The arrangement according to which the secondary winding is common to two cores has certain practical advantages; reduction of the copper, better cooling and reduction in the winding operation. Same advantages in the case of single premagnetization winding around all three columns 15, 25, 35.

It will be seen that the device described, as also moreover its variants cited, is identical in its three phases and has perfect electrical and geometrical symmetry. Its weight and its volume are reduced relative to the classical device comprising a transformer and a magnetic amplifier separated one from the other. The compactness of the device permits cooling by natural convection and the reduction of the number of windings has the advantage of a reduction of the number of connections and of the costs of labour for its execution and its mounting. Moreover, the magnetic coupling is more favourable, which has for result a reduction of the ampere-turns of the premagnetization circuit.

What I claim is:
1. A three phase electric arc welding power supply set, comprising in combination
   (a) a three phase power input (R, S, T),
   (b) two three phase transformers each having a magnetic core with three columns (11, 21, 31 and 22, 12 and 32 respectively),
   (c) three primary windings (41, 42; 51, 52 and 61, 62 respectively),
   (d) a magnetic amplifier having three magnetic cores with three columns (13, 14, 15; 23, 24, 25 and 33, 34, 35 respectively) each,
   (e) a control power input (A, B),
   (f) a control winding (111, 121, 131),
   (g) three secondary windings (71, 72; 81, 82 and 91, 92 respectively),
   (h) a power output (X, Y, Z), and
   (i) rectifying elements,
the three magnetic cores of the amplifier being disposed symmetrically between the two magnetic cores of the transformer is such a manner, that one magnetic core of the amplifier is between one column (41, or 51 or 61) of one transformer core and one column (42 or 52 or 62) of the other transformer core, each outer column of each amplifier core being adjacent to one column of one transformer core (13 to 11; 14 to 12; 23 to 21; 24 to 22; 33 to 31; and 34 to 32), each primary winding of a phase being connected to the power input and surrounding two corresponding columns (11 and 12; 21 and 22; 31 and 32) of the two primary magnetic cores, each secondary winding being connected to the power output and surrounding a pair of said adjacent columns (11, 13 and 12, 14; 21, 23 and 22, 24; 31, 33 and 32, 34), said control winding 111, 121, 131) being connected to the control power input and surrounding the middle columns (15, 25, 35) of each amplifier core, and said rectifying elements being disposed after the power output (X, Y, Z) to rectify the welding current.

2. A set according to claim 1, wherein each primary winding of each phase consists of two coils (41, 42; 51, 52 and 61, 62 respectively) connected in series, each coil surrounding one column of one of the transformer cores.

3. A set according to claim 1, wherein each primary winding of each phase consists of two coils connected in parallel and surrounding one column of one of the transformer cores.

4. A set according to claim 1, wherein each primary winding has intermediate connections to permit an adjustment of the output voltage.

5. A set according to claim 1, wherein each secondary winding has intermediate connections to permit an adjustment of the output voltage.

6. A set according to claim 1, wherein each secondary winding consists of two coils (71, 72; 81, 82 and 91, 92) each surrounding one column of one transformer core and one adjacent column of one amplifier core, said two coils being connected in series to produce a substantially constant current electric arc for welding with a refractory electrode.

7. A set according to claim 1, wherein each secondary winding consists of two coils (71, 72; 81, 82 and 91, 92) each surrounding one column of one transformer core and one adjacent column of one amplifier core, said two coils being connected in parallel, to produce a substantially constant voltage electric arc for welding with a continuously fed fusible electrode.

References Cited
UNITED STATES PATENTS

| | | | |
|---|---|---|---|
| 2,591,582 | 4/1952 | Monette | 321—25 X |
| 3,018,361 | 1/1962 | Rebuffoni | 219—131 |
| 3,171,092 | 2/1965 | Jetter | 336—160 X |
| 3,219,881 | 11/1965 | Rudaz | 323—48 X |
| 3,242,419 | 3/1966 | Walburn | 323—48 X |

JOSEPH V. TRUHE, Primary Examiner

J. G. SMITH, Assistant Examiner

U.S. Cl. X.R.

323—48; 336—5